Jan. 25, 1966                L. E. SANTUCCI                3,230,843
                    METHOD OF COMPACTING RESINOUS OVERLAYS
                             Filed June 29, 1962
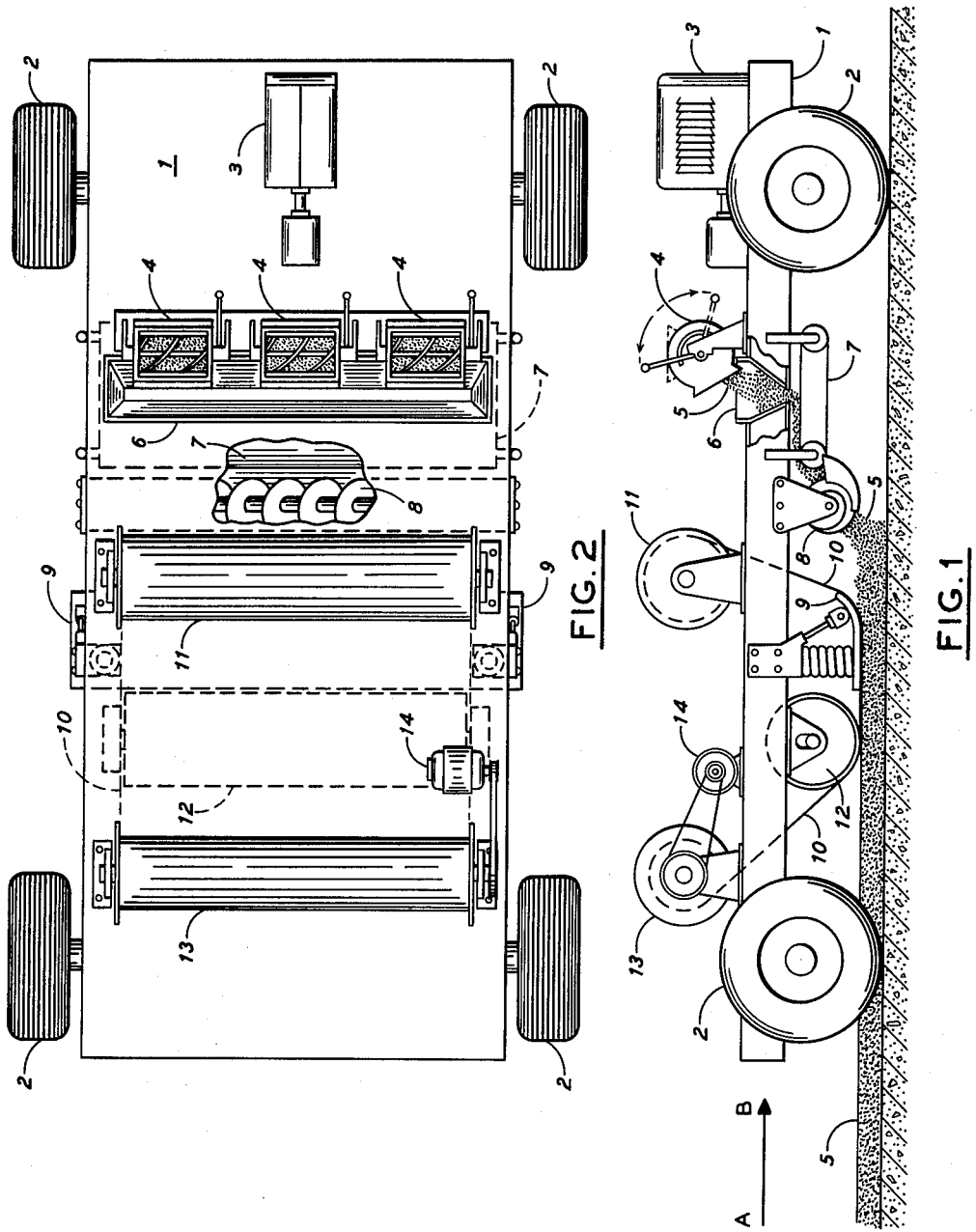
INVENTOR
LAWRENCE E. SANTUCCI
BY
ATTORNEYS United States Patent Office 3,230,843
Patented Jan. 25, 1966

3,230,843
METHOD OF COMPACTING RESINOUS OVERLAYS
Lawrence E. Santucci, Corte Madera, Calif., assignor to Chevron Research Company, a corporation of Delaware
Filed June 29, 1962, Ser. No. 206,451
8 Claims. (Cl. 94—23)

This invention relates to an improved method of compacting and firmly bonding surface coatings formed by mortars of tacky resinous materials and stone aggregate to underlying paved surfaces.

In particular, it relates to a novel and efficient method of compacting and bonding hardenable mortars of tacky resinous materials and stone aggregates to underlying paved surfaces, such as concrete pavements, without the drawbacks which usually accompany such applications, namely, without the tacky components of the mortar adhering to the compacting means, such as rollers, and permitting thereby formation of uniform, unbroken, strongly compacted overlays atop the underlying paved surfaces.

These mortars are prepared by thoroughly mixing mineral aggregate with (1) a resin, such as an unsaturated polyester, and (2) a cross-linking monomer, such as styrene and (3) effective proportions of a catalyst (initiator) and a cross-linking accelerator. Once prepared, the mortar is applied to the surface to be coated in a known manner, for instance, by flowing on, screeding, spreading with a blade or the like. Thereupon a compacting means, such as a steel wheel roller is employed to compact the surface before it hardens (sets). Compacting is intended to fill all the fissures and unevennesses of the undersurface with the mortar and to leave thereon a uniform surface of an impervious overlay.

However, almost invariably some of the mortar overlay, irrespective of the nature of the resinous component of the mortar, adheres to the roller, thus breaking up the uniformity of the surface-coating, impeding the progress of the compacting machinery and ultimately creating if not an unsurmountable, then in all events a very onerous and messy job of cleaning the resin from the machinery.

The present invention provides a novel and effective method of compacting the resinous mortar overlay, which eliminates the problem of the mortar being pulled away in the process of compacting, because of the resin sticking to the rollers of the compacting machinery. Furthermore, it provides right upon compacting an effective, strong, impervious and non-skid overlay surface.

Specifically, the invention relates to a method of compacting effectively mixtures or mortars of polyester resins and graded aggregates, such as are described in the copending application of R. J. Schmidt and L. E. Santucci, Serial No. 194,720 filed on May 14, 1962, in the U.S. Patent Office. In essence, the method involves placing a sheet of a flexible film material on the mortar surface, just prior to applying thereto a compacting force, such as the weight (load) of a roller or other appropriate compacting means. Any flexible film, which is sufficiently strong mechanically to withstand compacting (rolling), does not adhere too strongly to the mortar surface, and thus can be readily lifted (peeled) from it by hand without being ripped, can be used as a protective interlayer film. In general this "peelable" film is from about 1 to about 10 mils in thickness, films of about 2 to about 5 mils being particularly satisfactory to use. Thus, films of various film-forming synthetic resins, such as polyethylene, polypropylene, polyamides and polymers of methyl methacrylate, as well as wax paper and cloth, glass-fiber cloth, and paper or cloth impregnated with synthetic film-forming resins similar to those mentioned hereinabove, or with different rubbers, can be employed to act as the protective interlayer films. Polyolefin films and particularly polyethylene and polypropylene films, because of their high mechanical strength within a range of thicknesses from 1 to 5 mils, and also because of their availability and comparatively low cost, are preferred.

An unexpected result of applying the method of this invention consists in that by compacting (rolling) the mortar surface and immediately, or almost immediately (that is, within at most 5 to 10 minutes), removing the protective interlayer film before the mortar has set, an overlay with roughened (stippled-like) surface texture is obtained. This texture provides skid resistance, a valuable property indeed. Surprisingly, this roughened surface texture is observed to last despite being subjected to intense vehicular traffic.

Consistency of the mortar generally is not too critical as regards the texture (roughness) of the finished overlay surface. Thus in using a resin/sand mortar, such as polyester resin/graded sand mortar, and polyethylene interlayer films, compaction of the more fluid (soft), film-covered mortar provides a greater degree of roughness on the surface of the compacted and finally cured overlay than compaction of a less fluid, thicker polyester/sand mortar. It is noted that certain preferred combinations of resin/stone aggregate mortars and interlayer films provide a greater degree of desirable roughness of the surface of the overlay. This is the case of polyolefin films being used for compacting polyester resin/sand and epoxy resin/sand mortars. The exact mechanism underlying this "co-action" of the mortar and film materials is not fully understood. Nevertheless, the fact remains that whenever polyolefin films, such as polyethylene and polypropylene films, are used as interlayer films in the compacting method of the present invention, the surface of the compacted polyester resin or epoxy resin mortar overlay is found to be rougher and less likely to permit skidding.

The weight or load force imposed by the compacting means on the surface of the mortar covered by the protective interlayer film of resin, rubber, or wax-paper, in other words, the weight of the roller in the case of compacting machinery, such as a steel wheel roller, also is not critical. Usually, a roller applying force of from 5 to 60 lbs. per linear inch of the surface will produce a satisfactory, roughened and, hence, non-skid surface. In other words, the roller must be heavy enough to compact the mortar to a predetermined layer thickness which may be as low as $\frac{1}{8}''$. The surface of the compacting means or roller may be grooved or indented in any desired (regular or random) fashion to impart additional non-skid character to the surface of the overlay, so, however, as not to cut or otherwise damage the protective flexible film.

Accordingly, the choice of the thickness of this interlayer film within the broad range of 1 to 10 mils will depend on whether the compacting roller is smooth or, if indented, on the character of the indentation.

Where greater degree of skid resistance is desired, an application of a layer of fine angular grit to the surface of the compacted mortar before it is completely cured, will be advantageous.

In its simplest form, the method involves laying by hand a sheet of flexible film material, such as polyethylene or polypropylene or wax-paper, on the surface of the soft mortar, immediately after this latter has been poured on the paved undersurface and spread thereon (with blade spreaders or the like); then passing the compacting means (a roller) over the area covered by the flexible interlayer film, whereupon this latter is removed by hand in the manner similar to that of removing or peeling masking tape or the so-called "Scotch tape." The steps of laying the mortar on the next adjacent area, placing the sheet of film over it, compacting the film-covered area, and removing the film, are repeated until the entire surface to be coated with an overlay of the mortar has been thus treated.

An additional advantage of this method consists in that an applicator selecting film materials, chemically unreactive, at ambient temperatures with the resinous component of the mortar, need not remove the film immediately after compacting and may leave it on the surface of the mortar until this latter is completely cured (set). This is particularly true of polyester resin-aggregate mortars, when films of materials unreactive at ambient temperatures with such polyester resins, for instance, films of polyethylene, polypropylene, silicone-treated paper, wax-treated paper, and the like, are employed to cover the mortar surface to be compacted. Leaving the film on the surface after compaction and until the cure is completed prevents evaporation of the cross-linking agent (styrene), protects the mortar surface from adverse action of air-oxygen and moisture, which may interfere with polymerization, and thus assures satisfactory set of the overlay. Also, this technique protects the mortar surface while being cured from deleterious effects of nightly precipitation and rain damage until the surface is ready to be opened to traffic.

Various mechanical means which would automatically place (feed) the film on the mortar surface in front of the roller, and then would remove it when the roller has passed, can be employed in accordance with the principle of the invention. The device for the automatic placement of the film before the roller may be combined with a device for pouring and spreading the mortar on the paved undersurface, both devices being located on a suitably propulsed platform. After having been picked up by a rewind device, the film is wound up on a storage roll or spool and can be discarded.

A schematic representation of such an embodiment is shown in the accompanying drawing. In this drawing, numeral 1 designates a platform mounted on wheels with tires 2 and propulsed by a drive mechanism 3, such as a diesel engine.

The resin-forming components and the aggregate are combined into a mortar in a mixer 4. From this mixer, mortar 5 drops into a feed hopper 6 and is conveyed, for instance, by means of a belt conveyor 7 to a screw auger 8. This auger serves to pour mortar 5 on the surface of the pavement. As the platform moves in the direction AB shown by the arrow, mortar 5 is spread by means of a spring-loaded levelling shoe 9. A film 10, such as a polyethylene film, is fed from feed roller 11 against shoe 9 and under compaction roller 12 to storage roll 13. As the machinery progresses along the road, the mortar is compacted by a weighted compaction roller 12. The polyethylene film is wound up on a storage or waste roll 13 rotated by a motor 14 which may be actuated from the drive mechanism of the platform.

In place of the feed roll 11 or the pick-up (storage) roll 13 shown in the drawing, one may use a combination of two rolls with a continuous length of interlayer film; for instance, a length of a tear-and-wear resistant polyethylene, polypropylene, rubber, or the like. This film would pass over a driving roller and under the compacting roller having a speed of the two rolls so synchronized as to eliminate the risk of the film belt slipping off. This continuous film belt will be so chosen as to withstand wear in the course of compaction of the mortar for a maximum length of time, without becoming torn or necessitating too frequent replacements. In this embodiment, a blade may be provided immediately after the compacting roller to scrape off any mortar which may adhere to the belt, assuring thereby continuous unimpeded operation.

It is to be understood that various modifications of the invention described in the foregoing specification will occur to those skilled in the art reading the same. All such modifications are intended to be included as may be reasonably covered in the following claims.

I claim:
1. Method of compacting an organic resinous mortar on a paved undersurface to provide a roughened texture overlay thereon, said method comprising:
   (1) spreading the mortar on the paved undersurface;
   (2) placing on the surface of spread mortar a flexible sheet of a film material, peelable from said mortar surface;
   (3) applying a compacting force to such sheet of flexible film material and the area adjoining it to compact the underlying mortar surface;
   (4) withdrawing this force; and
   (5) peeling said sheet of flexible film material from the surface of the mortar upon withdrawal of the compacting force.
2. A method as defined in claim 1, wherein said sheet of flexible film material is from about 1 to about 10 mils thick.
3. A method as defined in claim 1, wherein said sheet of flexible film material is a sheet of polyethylene film.
4. A method as defined in claim 1 wherein said sheet of flexible film material is a sheet of polypropylene film.
5. A method as defined in claim 1, wherein said sheet of flexible film material is a sheet of polyethylene from about 1 to about 10 mils thick.
6. A method as defined in claim 1, wherein the flexible sheet of a film material is peeled immediately from the mortar surface upon withdrawal of the compacting force.
7. A method of compacting a polyester resin mortar on a paved undersurface to provide a roughened texture overlay thereon, said method comprising:
   (1) spreading the mortar on the paved undersurface;
   (2) placing on the surface of spread mortar a flexible sheet of a film material chemically unreactive with said polyester resin at ambient temperatures and peelable from said mortar surface;
   (3) applying a compacting force to said flexible sheet of film material and the area beneath it to compact the underlying surface;
   (4) withdrawing this force;
   (5) keeping said flexible sheet of film material on the surface of the mortar until the surface is cured; and
   (6) peeling said sheet of film material from the surface of the mortar.
8. A method as defined in claim 1, wherein said sheet of flexible film material is a sheet of polyolefin film.

References Cited by the Examiner
UNITED STATES PATENTS

| | | |
|---|---|---|
| 1,127,957 | 2/1915 | Bruner. |
| 1,768,366 | 6/1930 | McKesson. |
| 2,351,498 | 6/1944 | Fowler _____ 117—41 |
| 2,704,735 | 3/1955 | Hedges et al. _____ 117—6 |
| 2,898,825 | 8/1959 | Walker et al. _____ 94—1.5 |

CHARLES E. O'CONNELL, *Primary Examiner.*

JACOB L. NACKENOFF, *Examiner.*